US012560896B2

(12) United States Patent
Lamparter et al.

(10) Patent No.: US 12,560,896 B2
(45) Date of Patent: Feb. 24, 2026

(54) PROVIDING DOMAIN MODELS FOR INDUSTRIAL SYSTEMS

(71) Applicant: Siemens Healthcare GmbH, Erlangen (DE)

(72) Inventors: Steffen Lamparter, Feldkirchen (DE); Maja Milicic Brandt, Munich (DE); Nataliia Rümmele, Munich (DE); Swathi Shyam Sunder, Munich (DE)

(73) Assignee: Siemens Healthineers AG, Forchheim (DE)

( * ) Notice: Subject to any disclaimer, the term of this patent is extended or adjusted under 35 U.S.C. 154(b) by 1246 days.

(21) Appl. No.: 17/386,901

(22) Filed: Jul. 28, 2021

(65) Prior Publication Data

US 2022/0035321 A1     Feb. 3, 2022

(30) Foreign Application Priority Data

Jul. 31, 2020     (EP) .................................... 20189009

(51) Int. Cl.
| | |
|---|---|
| *G05B 13/02* | (2006.01) |
| *G06F 18/20* | (2023.01) |
| *G06F 18/21* | (2023.01) |

(52) U.S. Cl.
CPC ......... *G05B 13/028* (2013.01); *G05B 13/026* (2013.01); *G06F 18/2178* (2023.01); *G06F 18/285* (2023.01); *G06F 18/295* (2023.01)

(58) Field of Classification Search
CPC . G05B 13/028; G05B 13/026; G06F 18/2178; G06F 18/285; G06F 18/295;
(Continued)

(56) References Cited

U.S. PATENT DOCUMENTS

| | | | | |
|---|---|---|---|---|
| 6,865,509 B1 * | 3/2005 | Hsiung | .............. | G05B 23/0286 |
| | | | | 702/182 |
| 2008/0077544 A1 * | 3/2008 | Sureka | ..................... | G06N 7/01 |
| | | | | 706/13 |

(Continued)

OTHER PUBLICATIONS

European Search Report for European Application No. 20189009. 2-1222 dated Nov. 3, 2020.
(Continued)

*Primary Examiner* — Christopher W Carter
(74) *Attorney, Agent, or Firm* — Lempia Summerfield Katz LLC

(57)     ABSTRACT

Hidden Features are locally extracted from Industrial Data of the industrial system by a Local Application executed on a local computer of a customer. The Hidden Features are uploaded to an external computer of a service provider. A Domain Model for the industrial system is externally determined from an Industrial Model Library (IML) on the external computer based on the uploaded Hidden Features by an External Algorithm including at least one Machine Learning Model (MLM) executed on the external computer. The determined Domain Model for the industrial system is provided to the customer. The at least one MLM has been trained on ranking most appropriate Domain Models for industrial systems based on Hidden Features of the respective industrial systems. The most appropriate Domain Models represent all relevant technical aspects of the respective industrial systems.

11 Claims, 4 Drawing Sheets

(58) Field of Classification Search
CPC ......... G06F 16/212; G06F 16/27; G06N 7/01;
G06N 20/10; G06N 3/084; G06N 3/04;
G06N 3/08; G06N 3/088; G06Q 10/067
See application file for complete search history.

(56) References Cited

U.S. PATENT DOCUMENTS

| | | | |
|---|---|---|---|
| 2014/0122370 A1* | 5/2014 | Jamal ................ | G06Q 30/0201 |
| | | | 705/348 |
| 2016/0358099 A1* | 12/2016 | Sturlaugson ........... | G06N 5/043 |
| 2018/0018570 A1* | 1/2018 | Mizoguchi ............. | G06F 17/18 |
| 2019/0354850 A1* | 11/2019 | Watson ................. | G06N 3/045 |
| 2021/0349429 A1* | 11/2021 | Grehant ................ | G06N 3/045 |
| 2022/0351004 A1* | 11/2022 | Kanter ................. | G06F 18/285 |

OTHER PUBLICATIONS

Nguyen Hung et al: "AutoGAN-based dimension reduction preservation"; Neurocomputing, Elsevier; Amsterdam, NL; vol. 384; Dec. 4, 2019; pp. 94-103.
StackExchange—Data Science—Meaning of Latent Features. Obtained: https://datascience.stackexchange.com/questions/749/meaning-of-latentfeatures#:~:text=At%20the%20expense%20of%20over,from%20the%20documents%20are%20features—pp. 1-7 obtained on Jul. 20, 2022.

* cited by examiner

PROVIDING DOMAIN MODELS FOR INDUSTRIAL SYSTEMS

CROSS REFERENCE TO RELATED APPLICATIONS

This patent document claims the benefit of EP 20189009.2 filed on Jul. 31, 2020 which is hereby incorporated in its entirety by reference.

FIELD

Embodiments relate to a computer-implemented method of, and a distributed system for providing a domain model for an industrial system.

BACKGROUND

Throughout all branches of industry data preparation is one of the first steps in the process of developing domain-specific applications. Although it may seem that data preparation mainly varies based on factors such as the domain, the source systems, or the data formats, majority of the effort is actually repetitive, especially the effort in data modelling and data integration.

This leads to several problems. For example, investment of huge efforts in data preparation activities due to the requirement of both domain expertise and expertise in data/knowledge engineering. Also repeated effort in Extraction-Transformation-Loading (ETL) activities by writing lots of scripts with overlapping code is a result of in common data preparation. Further, there has to be an understanding of different data formats and storage systems. Moreover, for inexperienced users it is difficult to perform these tasks, thereby leading to incorrect data preparation practices, that are usually discovered quite late, further resulting in substantial delays in the development of domain specific applications.

Overall, data preparation is a cost-intensive and time-consuming process, in addition to being error-prone and repetitive. This makes it one of the major bottlenecks while developing data-driven applications for various industries and businesses.

Therefore, automation of the data modelling is desirable and might significantly reduce the time needed for developing domain-specific applications, while errors due to lacking domain/system knowledge or programming proficiency might be avoided. However, Industrial Data that includes detailed information about the processes within an industrial system are often confidential. Consequently, customers often don't want to share such confidential data with third parties. Consequently, there is a need for secure transfer of information including all technically relevant aspects of industrial systems with a service provider providing Domain Models, such that neither the service provider nor any third person may deduce the processes within the industrial systems (no reverse engineering based on the provided information).

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments overcome or at least alleviate these problems by providing a computer-implemented method of providing a domain model for an industrial system and a corresponding computer-program, computer-readable medium, and data processing system, as well as a Neural Network (NN) for and a distributed system for providing a domain model for an industrial system.

In an embodiment, a computer-implemented method of providing a domain model for an industrial system includes the following steps: locally extracting Hidden Features from Industrial Data of the industrial system by a Local Application executed on a local computer of a customer, uploading the Hidden Features to an external computer of a service provider, externally determining a Domain Model for the industrial system from an Industrial Model Library on the external computer based on the uploaded Hidden Features by an External Algorithm comprising at least one Machine Learning Model (MLM) executed on the external computer, and providing the determined Domain Model for the industrial system to the customer.

The at least one MLM has been trained on ranking most appropriate Domain Models for industrial systems based on Hidden Features of the respective industrial systems. The most appropriate Domain Models represent all relevant technical aspects of the respective industrial systems.

In an embodiment, a computer program includes instructions that, when the program is executed by a computer, cause the computer to carry out the steps of the method.

In an embodiment, a computer-readable medium includes stored thereon the computer program.

In an embodiment, a data processing system carries out the steps of the method.

In an embodiment, a distributed system for providing a domain model for an industrial system may be configured to execute the computer-implemented method and includes at least one local computer of at least one customer, an external computer of a service provider and at least one data connection between the at least one local computer and the external computer. The at least one local computer is configured to execute a Local Application. The external computer is configured to execute an External Application including at least one Machine Learning Model (MLM). The at least one data connection is configured to upload Hidden Features from the local computer to the external computer and to provide a Domain Model from the external computer to the at least one customer. The at least one Local Application is configured to locally extract the Hidden Features from Industrial Data of the industrial system. The at least one External Application is configured to externally determine the Domain Model for the industrial system from an Industrial Model Library on the external computer based on the Hidden Features uploaded from the at least one local computer via the at least one data connection. The at least one Local Layer and the at least one MLM is trained on ranking most appropriate Domain Models for industrial systems based on Hidden Features of the respective industrial systems. The most appropriate Domain Models (DM) represent all relevant technical aspects of the respective industrial systems.

Unless otherwise stated in the following description, the terms "carry out", "calculate", "computer-aided calculate", "determine", "generate", "configure", "reconstruct" and the like preferably refer to actions, processes, or processing steps that change or generate data or convert data into other data, whereby the data are or may be represented or present for example physical quantities. For example, the term "computer" is to be interpreted as broadly as possible to cover all electronic devices with data processing characteristics. Computers may thus be, for example, personal computers (PCs), servers, programmable logic controllers (PLCs), handheld computer systems, pocket PC devices, mobile telephones, smart phones and other communication devices that may process data by processors and other electronic devices for data processing.

The at least one MLM is a model based on Machine Learning Algorithms (MLAs). MLAs are algorithms that improve a performance automatically through experience or training. MLAs build a model based on sample data, known as training data or training samples, in order to make predictions or decisions without being explicitly programmed to do so. Machine Learning (ML) involves creating a model, that is trained on some training data and then may process input data to make predictions. An MLA may implement an Artificial Neural Network (ANN or just Neural Network, NN), a decision tree, a Support Vector Machine (SVM), a regression analysis, a Bayesian network, a genetic algorithm and the like.

For example, (A)NNs are systems, for example computing systems, inspired by biological neural networks that constitute animal brains. ANNs "learn" to perform tasks by considering (labelled) examples or training data, generally without being configured with any task-specific rules. During an initial learning or training phase ANNs automatically generate identifying characteristics from the (labelled) training data. ANNs include a collection of connected nodes called artificial neurons, that loosely model the neurons in a biological brain. Each connection (synapses in the biological brain) may transmit a signal from one node to another. A node that receives a signal may process it and then signal to subsequent neurons connected to it. In common ANN implementations, the signal at a connection between nodes is a real number (e.g., 0 . . . 1), and the output of each artificial neuron is computed by some non-linear function of the sum of its inputs (from other nodes). The connections between nodes are called "edges". The edges in ANNs may each have a weight that is adjusted during training of the ANNs. The weight increases or decreases the strength of the signal at the corresponding edge. Nodes may each have a threshold such that the signal is only sent if an aggregate signal exceeds that threshold. Typically, nodes are aggregated into layers. Different layers may perform different kinds of transformations on their inputs. Signals travel from a first layer or input layer to a last layer or output layer, possibly after traversing the layers multiple times.

In other words, an (A)NN is a network of basic elements, the nodes or artificial neurons, that receive input. After receiving input, the nodes change their internal state (activation) according to that input, and produce output depending on the input and activation. The network forms by connecting the output of certain nodes to the input of other nodes forming a directed, weighted graph. The weights as well as the functions that compute the activation of each node may be modified during initial learning/training, that is governed by a learning rule or paradigm.

A node receiving an input from at least one predecessor neuron include the following components: an activation, the node's state, depending on a discrete time parameter, optionally a threshold, that stays fixed unless changed by a learning/training function, an activation function (e.g. hyperbolic tangent function, sigmoid function, Softmax function, rectifier function etc.) that computes the new activation at a given time and the net input and an output function computing the output from the activation (often the output function is the identity function). An important characteristic of the activation function is that it provides a smooth transition as input values change, i.e., a small change in input produces a small change in output.

An input node has no predecessor but serves as input interface for the whole ANN. Similarly, an output node has no successor and thus serves as output interface of the whole ANN. An ANN include edges/connections, each edge transferring the output of a node (predecessor) to the input of another, succeeding node (successor). Additionally, to the assigned weight an edge may include a bias term added to a total weighted sum of inputs to serve as a threshold to shift the activation function. The propagation function computes the input to the succeeding node (successor) from the outputs of preceding nodes (predecessors) and may include the bias value.

The deep NN includes more than one layer, more than four layers, more than seven layers, or more than ten or more layers for example. Each layer may include several neurons or nodes. each layer may contain ten or more, 50 or more, or 100 or more neurons for example.

A core objective of a MLA, i.e., of a learner, is to generalize from its experience. Generalization in this context is the ability of a MLA to perform accurately on new, unseen examples/tasks. i.e., input data, after having experienced one or more learning data sets. The training examples of the training data sets come from some generally unknown probability distribution (considered representative of the space of occurrences) and the learner/MLA has to build a general model about this space that enables it to produce sufficiently accurate predictions in new cases. The types of machine learning algorithms differ in their approach, the type of data they input and output, and the type of task or problem that they are intended to solve.

For example, a learning or rather training rule or paradigm may be an algorithm that modifies the parameters of a respective MLA, in order for a given input to the MLA to produce a favoured output. The training may include modifying the scalable parameters of the MLA, for example, the weights and thresholds of the variables within an ANN. Given a specific task to solve and a class of functions, learning includes using a set of observations to find the one function of the class of functions, that solves the task in some optimal sense. This entails defining a cost function such that for the optimal solution the cost is minimal and no other solution has a cost less than the cost of the optimal solution. The cost function is an important concept in learning, as it is a measure of how far away a particular solution is from an optimal solution to the problem to be solved. Learning algorithms search through the solution space to find a function that has the smallest possible cost. For applications where the solution is data dependent, the cost must necessarily be a function of the observations, otherwise the model might not relate to the data. It is frequently defined as a statistic to which only approximations may be made. It is possible to define an arbitrary cost function, however, a particular cost function may be used either because it has desirable properties (e.g., convexity) or because it arises naturally from a particular formulation of the problem.

For example, an ANN may be discriminatively trained with a standard backpropagation algorithm Backpropagation is a method to calculate the gradient of a loss function (produces the cost associated with a given state) with respect to the weights in the ANN. The weight updates of backpropagation may be done via stochastic gradient descent. The choice of the cost function depends on factors such as the learning type (e.g., supervised, unsupervised, reinforcement etc.) and the activation function. Commonly, the activation function and cost function are the Softmax function and cross entropy function, respectively.

In other words, training an ANN includes selecting one model from the set of allowed models (or, in a Bayesian framework, determining a distribution over the set of allowed models) that minimizes the cost. Commonly some form of gradient descent is deployed, using backpropagation to compute the actual gradients. This is done by taking the derivative of the cost function with respect to the network parameters and then changing those parameters in a gradient-related direction. Backpropagation training algorithms fall into three categories: steepest descent (with variable learning rate and momentum, resilient backpropagation), quasi-Newton (Broyden-Fletcher-Goldfarb-Shanno, one step secant), Levenberg-Marquardt and conjugate gradient (Fletcher-Reeves update, Polak-Ribiére update, Powell-Beale restart, scaled conjugate gradient).

Common training paradigms include, for example, supervised learning, unsupervised learning and reinforcement learning.

Supervised learning algorithms build a mathematical model of a set of data that contains both the inputs and the desired outputs (labels). The training data includes of a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function (L), supervised learning algorithms learn a function that may be used to predict the output associated with new inputs. An optimal function will allow the algorithm to correctly determine the output for inputs that were not a part of the training data. Supervised learning uses a set of example pairs and the aim is to find a function in the allowed class of functions that matches the examples. In other words, the mapping implied by the data is inferred; the cost function is related to the mismatch between the mapping of the model e.g., the ANN and the data and it implicitly contains prior knowledge about the problem domain. The cost may be the mean-squared error, that tries to minimize the average squared error between the MLA's/ANN's output and a target value over all the example pairs. For example, minimizing this cost using gradient descent for the class of ANNs called multilayer perceptrons (MLP), produces the backpropagation algorithm for training ANNs.

Unsupervised learning algorithms take a set of data that contains only inputs, and find structure in the data, like grouping or clustering of data points. The algorithms, therefore, learn from test data that has not been labelled, classified or categorized. Instead of responding to feedback, unsupervised learning algorithms identify commonalities in the data and react based on the presence or absence of such commonalities in each new piece of data. In unsupervised learning, some data is given and the cost function to be minimized that may be any function of the data and the MLA's/ANN's output. The cost function is dependent on the task and any a priori assumptions (e.g., implicit properties or parameters of the model, observed variables etc.).

Reinforcement learning is an area of machine learning concerned with how software agents ought to take actions in an environment so as to maximize some notion of cumulative reward. In machine learning, the environment is typically represented as a Markov Decision Process (MDP). Reinforcement learning algorithms do not assume knowledge of an exact mathematical model of the MDP, and are used when exact models are infeasible. For example, reinforcement learning algorithms are used in autonomous vehicles or in learning to play a game against a human opponent. As in reinforcement learning, data is usually not given, it is instead generated by an agent's interactions with the environment. At each point in time the agent performs an action and the environment generates an observation and an instantaneous cost according to some (usually unknown) dynamics. The aim is to discover a policy for selecting actions that minimizes some measure of a long-term cost, e.g., the expected cumulative cost. The environment's dynamics and the long-term cost for each policy are usually unknown, but may also be estimated. The environment is commonly modelled as MDP with states and actions with the following probability distributions: the instantaneous cost distribution, the observation distribution and the transition, while a policy is defined as the conditional distribution over actions given the observations. Taken together, the two then define a Markov chain (MC). The aim is to discover the policy (i.e., the MC) that minimizes the cost.

In an embodiment, the Local Algorithm is executed on the local computer of the customer and the External Algorithm including the at least one MLM is executed on the external computer of the service provider. The Local Application and the External Application may be seen as one joint algorithm and include at least one input layer and at least one output layer. The at least one input layer of the joint algorithm may be configured to receive the Industrial Data of the industrial system. The at least one output layer of the joint algorithm may be configured to output the derived Domain Model for the industrial system.

The joint algorithm including the Local Application and the at least one External Application with the at least one MLM may have been jointly trained (end-to-end) with training sets of training Industrial Data and corresponding rankings of training Domain Models as ground truth. The training Domain Models are considered the most appropriate Domain Models for the respective industrial systems and the respective rankings give the labels to train (update the weights/scalable parameters of the MLM(s) of) the joint algorithm For example, each training set may include industrial data of a real industrial system or of a model of an industrial system as the training Industrial Data and a corresponding ranking of training Domain Models that were derived as the most appropriate Domain Models by system experts, domain experts, and data experts based on the respective industrial system from which the respective training Industrial Data was derived. For example, the training of the joint Algorithm may have been conducted on one computer, where the at least one Local Application and the at least one External Application including the at least one MLM have been executed on the one computer. The joint application under training might also include the at least one input layer and the at least one output layer of the joint application. After the training has been completed, the (trained) Local Application is provided to the local computer of the customer and the at least one trained External Application is provided to the external computer of the service provider.

The most appropriate Domain Model of an industrial system may be a Domain Model that represents all relevant technical aspects of the respective industrial system. The relevant technical aspects are for example the technical, physical or chemical quantities that are necessary to describe the industrial system or the at least some aspects of the industrial system. The relevant technical aspects may include quantities like, temperatures, positions, velocities, accelerations, forces, pressures, pH, density, states, etc. In other words, all relevant technical, physical or chemical quantities may be processed in a domain specific application for the industrial system based on the most appropriate Domain Model. At the same time, the most appropriate Domain Model only includes necessary but no unused or superfluous data structures and hierarchies.

The Industrial Data and the training Industrial Data, respectively, may include all relevant technical aspects of the industrial system. Different physical variables may be included in the Industrial Data, like temperatures, forces, pressures, positions, velocities, accelerations, voltages, currents, powers, flow rates, light intensity, discrete states of technical components, etc. For example, the Industrial Data may be confidential Industrial Data containing confidential information about processes within the respective industrial system.

The Local Application may include at least one input layer and at least one output layer. The at least one input layer of the Local Algorithm corresponds to the at least one input layer of the joint algorithm. For example, the Local algorithm may be a software application that uses statistical methods for computing the Hidden Features (i.e., latent features) from the input Industrial Data. Examples of the Hidden Features include: (1) character distribution; (2) entropy of values; (3) proportion of missing values or special characters; (4) inferred data types; (5) features specific to inferred data types (e.g., for numerical data types these might be median, avg, min, max).

The Local Algorithm is executed on the local computer of the customer. At the side of the customer the Industrial Data, that may be confidential, is provided to the Local Algorithm. The Local Algorithm extracts the Hidden Features from the provided (confidential) Industrial Data. Thus, the (confidential) Industrial Data is not provided to any third party, but instead locally computed into the Hidden Features.

The External Algorithm includes the at least one MLM and may further include at least one input layer and at least one output layer. The at least one output layer of the External Algorithm corresponds to the at least one output layer of the joint algorithm For example, the at least one MLM may include 1 to 100 External Layers (e.g., of a Neural Network (NN) or another type of MLM), 1 to 10 input layers, and/or 1 to 10 output layers. Each layer may include 2 to 1000 nodes. The at least one External Layer as well as the at least one input layer of the External Algorithm and the at least one output layer of the External Algorithm may be fully connected layers.

For example, the at least one MLM, that is part on the externally executed External Algorithm is configured to extract the ranking of the most appropriate Domain Models and, thereby, the optimal Domain Model from all the Domain Models stored in the Industrial Model Library on the external computer for the industrial system from the Hidden Features extracted by the Local Application. The extracted optimal/highest ranked Domain Model represents a data structure and hierarchy that covers all relevant technical aspects of the respective industrial system. The Domain Model is determined based on the Hidden Features, but not on the (confidential) Industrial Data itself.

The External Algorithm is executed on the external computer of the service provider. At the side of the service provider only the Hidden Features but not the Industrial Data, that may be confidential, is provided to the External Algorithm, for example, to the at least one MLM. The External Algorithm/at least one MLM determines the optimal Domain Model, or rather the ranking of most appropriate Domain Models, for the industrial system from the Industrial Model Library based on the provided (non-confidential) Hidden Features. Not the (confidential) Industrial Data, but only the (non-confidential) Hidden States are provided to a third party, i.e., the service provider in order to derive the optimal Domain Model for the industrial system.

Confidential information like industrial data of an industrial system is not provided from the customer to the service provider. Instead, only non—confidential data in form of Hidden Features is uploaded from the customer to the service provider. Thus, no unauthorised person may get hold of confidential information about the industrial system or processes within the latter.

According to an embodiment, the External Algorithm includes a multitude of MLMs stored in a Machine Learning Model Library, MLML, on the external computer or accessible with the external computer. The step of externally determining a Domain Model includes the steps of: selecting most appropriate MLMs from the MLML based on the uploaded Hidden Features by finding sets of features associated with the MLMs most similar to the uploaded Hidden Features, ranking the selected most appropriate MLMs according to an applicability based on feature set similarities, and ranking the most appropriate Domain Models for the industrial system based on the uploaded Hidden Features by the ranked, selected most appropriate MLMs.

The MLML is a repository for MLMs. The MLML may be continuously updated with new MLMs. The MLML is stored on the external computer or at least accessible from the external computer.

The most appropriate MLMs for the uploaded Hidden Features are those MLMs of the MLML that have most (input) features in common with the uploaded Hidden Features. Thus, by finding sets of features associated with the MLMs most similar to the uploaded Hidden Features, the most appropriate MLMs may be selected. With the selected most appropriate MLMs for the uploaded Hidden Features the latter may be projected into rankings of most appropriate Domain Models for the respective industrial system.

Before the Hidden Features are projected to rank the Domain Models stored in the Industrial Model Library, the selected most appropriate MLMs are ranked. The Ranking of the selected most appropriate MLMs is deduced from the applicability based on feature set similarities. The applicability describes the grade or level of similarity between the uploaded Hidden Features and the features of the selected most appropriate MLMs.

With the ranked, selected most appropriate MLMs, i.e., the top-10 or top-5 or top-3 or only the top ranked, selected most appropriate MLM(s), the most appropriate Domain Models of the Industrial Model Library are ranked for the respective industrial system by projecting the uploaded Hidden Features with the ranked, selected most appropriate MLM(s). The ranking of the most appropriate Domain Models is based on the weighted output i.e. the predicted ranking of the ranked, selected most appropriate MLMs, i.e. the top-10 or top-5 or top-3 or only the top ranked, selected most appropriate MLM(s) (e.g. the most appropriate Domain Models predicted by the third placed selected most appropriate MLM is weighted less than those of the second placed selected most appropriate MLM, the most appropriate Domain Models predicted by the second placed selected most appropriate MLM is weighted less than those of the first placed selected most appropriate MLM).

Thus, the optimal Domain Model may be determined in a particular fat and reliable manner.

According to an embodiment, the External Algorithm includes general purpose MLMs. In the step of selecting most appropriate MLMs, the most appropriate MLMs are further selected by configuring the general purpose MLMs based on the uploaded Hidden Features.

Besides or instead of the selecting of the MLMs stored in the MLML, the general purpose MLMs of the External Algorithm may be configured to fit to the uploaded Hidden Features. Afterwards the configured general purpose MLMs and additionally or alternatively the selected most appropriate MLMs from the MLML are ranked as described above.

The configuring of general purpose MLMs offers an efficient way of selecting most appropriate MLMs.

According to an embodiment, the method further includes at least the initial step of: downloading the Local Application to the local computer from an external source.

The external source may be a repository or database. The external source may be owned by the service provider. The Local Application may be downloaded from the external source to the local computer of the customer. Likewise, the External Application may be provided from the external source to the external computer of the service provider, for example after training of the joint application.

By simple downloading and providing, respectively, of the (trained) Applications the perquisites for providing a Domain Model for an industrial system may be very easily distributed and setup.

According to an embodiment, the method further includes the following steps, uploading the provided Domain Model (together with information about the industrial system to the external computer and storing the uploaded Domain Model and the information about the industrial system in the Industrial Model Library on the external computer.

According to an embodiment the at least one local computer and the at least one data connection are further configured to forward and upload the provided Domain Model together with information about the industrial system to the external computer. The external computer is further configured to store the uploaded Domain Model and the information about the industrial system in the Industrial Model Library on the external computer.

The customer may choose to share the provided Domain Model for the industrial system and further information about the industrial system, like domain, type, structure, processes and even industrial data etc. with the service provider.

With the shared information about the industrial system and the Domain Model, the joint application or at least its External Application including the at least one MLM may be further trained (fine-tuned) and the deriving of most appropriate Domain Models may be refined.

According to an embodiment the method further includes the following step: configuring the determined Domain Model based on feedback of domain experts on the determined Domain Model.

The determined Domain Model is configured, i.e., extended, reworked, etc., based on the feedback of domain experts before the Domain Model is provided to the customer.

Thereby, a quality control and a plausibility check of the automatically determined Domain Model is included. This increases the functionality and operational reliability of the provided Domain Models.

DETAILED DESCRIPTION

Figure 1:
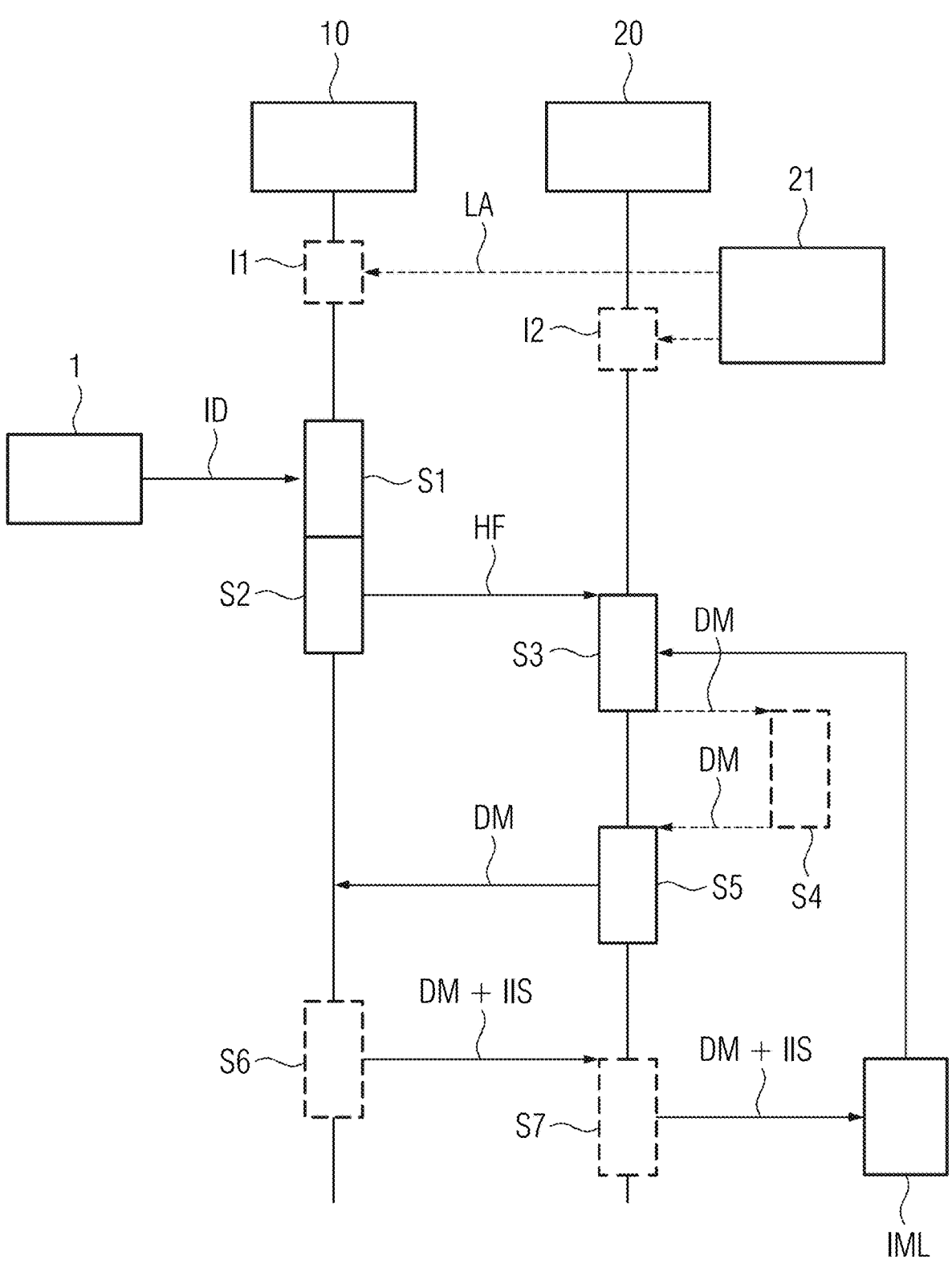
FIG. 1 depicts a schematic flow chart of the computer-implemented method of providing a Domain Model for an industrial system according to an embodiment.

In FIG. 1 the computer-implemented method of providing a Domain Model DM for an industrial system 1 is schematically depicted.

The computer-implemented method includes the optional initial steps of downloading I1 the Local Application LA, and providing I2 the External Application EA. The method further includes the steps of locally extracting S1 Hidden Features HF, uploading S2 the Hidden Features HF, externally determining S3 a Domain Model DM, optionally configuring S4 the determined Domain Model DM, providing S5 the Domain Model DM, optionally uploading S6, and optionally storing S7.

In the optional initial step I1 of downloading the Local Application LA, the (trained) Local Application LA is downloaded from an external source 21 of a service provider to a local computer 10 of a customer.

In the optional initial step I2 of providing the External Application EA, the trained External Application including at least one trained Machine Learning Model (MLM) is provided from the external source 21 to an external computer 20 of the service provider.

In the step S1 of locally extracting Hidden Features HF, the Hidden Features HF are extracted from Industrial Data ID of the industrial system 1. The Industrial Data ID may be received by the local computer 10 directly from the industrial system 1 (e.g., a control unit of the industrial system 1). The Hidden Features HF are extracted from the Industrial Data ID by the (downloaded) Local Algorithm LA that is executed on the local computer 10. The Local Algorithm LA includes statistical methods SM and optionally at least one input layer for receiving the Industrial Data ID and at least one output layer for outputting the extracted Hidden Features HD.

In the step S2 of uploading the Hidden Features HF, the Hidden Features HF are uploaded to the external computer 20.

In the step S3 of externally determining a Domain Model DM, the Domain Model DM for the industrial system 1 is determined based on the Hidden Features HF extracted by the Local Layer. The (provided) External Algorithm EA that is executed on the external computer 20 determines the Domain Model DM from an Industrial Model Library IML based on the uploaded Hidden Features HF. Thereto, the External Algorithm EA includes the at least one MLM and optionally at least one input layer for receiving the uploaded Hidden Features HF and at least one output layer for outputting the determined Domain Model DM for the industrial system 1. The optimal Domain Model DM is determined based on a ranking of the most appropriate Domain Models for the industrial system 1 which ranking is predicted by the External Algorithm EA based on the uploaded Hidden Features HF.

For example, in the step S3 of externally determining a Domain Model DM, firstly, most appropriate MLMs are selected from MLMs stored in a Machine Learning Model Library (MLML) of the external computer based on highest similarities between the sets of (input) features of the MLMs and the uploaded Hidden Features HF, secondly, the selected MLMs are ranked according to an applicability, that is based on feature set similarities between the sets of (input) features of the selected most appropriate MLMs and the uploaded Hidden Features HF, and, thirdly, the most appropriate Domain Models DM for the industrial system 1 are ranked based on the uploaded Hidden Features HF by the ranked, selected most appropriate MLMs.

In the optional step S4 of configuring the determined Domain Model DM, the determined Domain Model DM is configured (extended, reworked, etc.) based on feedback of domain experts on the determined Domain Model DM. The automatically determined Domain Model DM is analysed and reviewed by domain experts (system engineers, data engineers, etc.) and if necessary configured.

In the step S5 of providing the determined Domain Model (DM), the determined and optionally configured Domain Model DM for the industrial system 1 is provided to the customer. The Domain Model DM is, for example, downloaded to the local computer 10 of the customer.

In the optional step S6 of uploading, the provided Domain Model DM together with information IIS about the industrial system 1 is uploaded to the external computer 20. The information ISS about the industrial system 1 may include information about the domain, type, structure, processes and even industrial data of the industrial system 1.

In the optional step S7 of storing, the uploaded the provided Domain Model DM together with information IIS about the industrial system 1 is stored in the Industrial Model Library IML on the external computer 20. The stored Domain Model DM together with the respective information ISS about the industrial system 1 may be used as further training set for refined training of at least the External Application including the at least one MLM.

No confidential data like the Industrial Data ID of the industrial system 1 but only the non-confidential Hidden features HF leaves the local computer 10 of the customer without consent. Further, it is impossible or at least very time consuming and computationally expensive to reconstruct the Industrial Data ID form the Hidden Features HF. Consequently, the method of providing a Domain Model is very secure.

Figure 2:
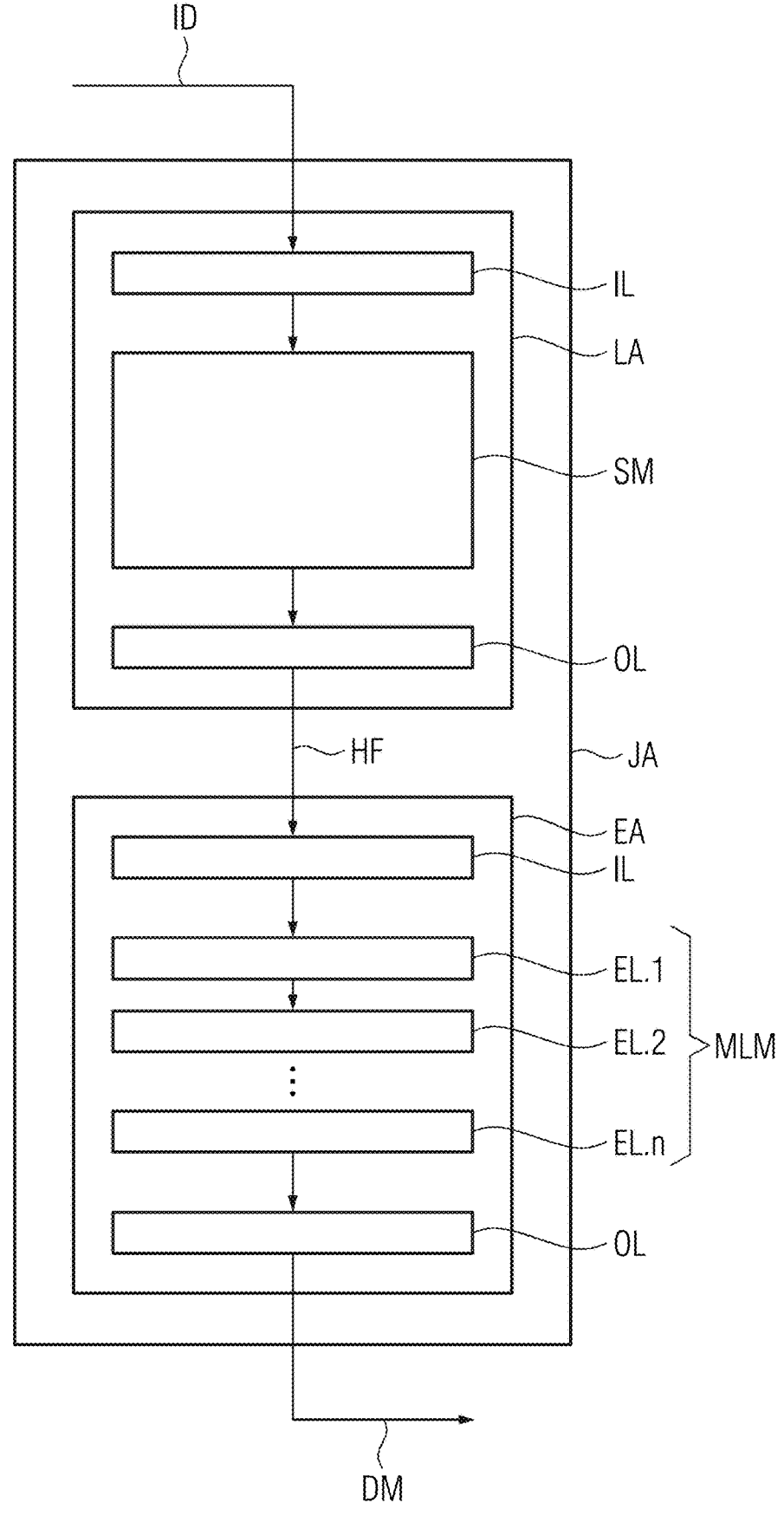
FIG. 2 depicts a schematic view of a joint algorithm including the Local Algorithm and the External Algorithm according to an embodiment.

In FIG. 2 an embodiment of a joint algorithm JA for providing a Domain Model DM for an industrial system 1 is schematically depicted. The joint algorithm JA includes two algorithms, the Local Algorithm LA and the External Algorithm EA. The Local Algorithm LA is executed on the local computer 10 (see FIGS. 1 and 3) of the customer. The External Algorithm EA is executed on the external computer 20 (see FIGS. 1 and 3) of the service provider.

The Local Algorithm LA includes an input layer IL and an output layer OL as well as statistical methods for computing Hidden Features HF. The input Layer IL of the Local Application LA corresponds to the input layer of the joint application JA.

The External Application EA includes an input layer IL and an output layer OL as well as n trained External Layers EL.1...EL.n of at least one MLM, e.g., of at least one Neural Network (NN). The output Layer OL of the External Application EA corresponds to the output layer of the joint application JA. The Input Layer IL, the output Layer OL and the External Layers EL of the External Application EA are fully connected layers.

Industrial Data ID of the industrial system 10 (see FIGS. 1 and 3) is forwarded to the input layer IL of the Local Algorithm LA. The Local Algorithm LA extracts the Hidden Features HF, for example by its statistical methods, from the Industrial Data ID.

From the output layer OL of the Local Application LA the Hidden Features HF extracted from the Industrial Data ID are forwarded to the input layer IL of the External Application EA.

The External Application EA determines the ranking of most appropriate Domain Models DM from the Industrial Model Library IML, i.e., derives the optimal Domain Model DM, for example by its n trained External Layers EL, based on the Hidden Features HF. The determined ranking or rather optimal Domain Model DM corresponds to the output at the output layer OL of the External Application EA.

The joint Application, for example its Local Application LA and its External Application including the at least one MLM, were trained end-to-end using training sets of training Industrial Data and training rankings of training Domain Models. The utilised training Domain Models represent the most appropriate Domain Models for the respective industrial systems from which the training Industrial Data stem. The most optimal Domain Model DM encompasses all technically relevant aspects of the respective industrial system and only includes necessary but no superfluous data structures and hierarchies.

Figure 3:
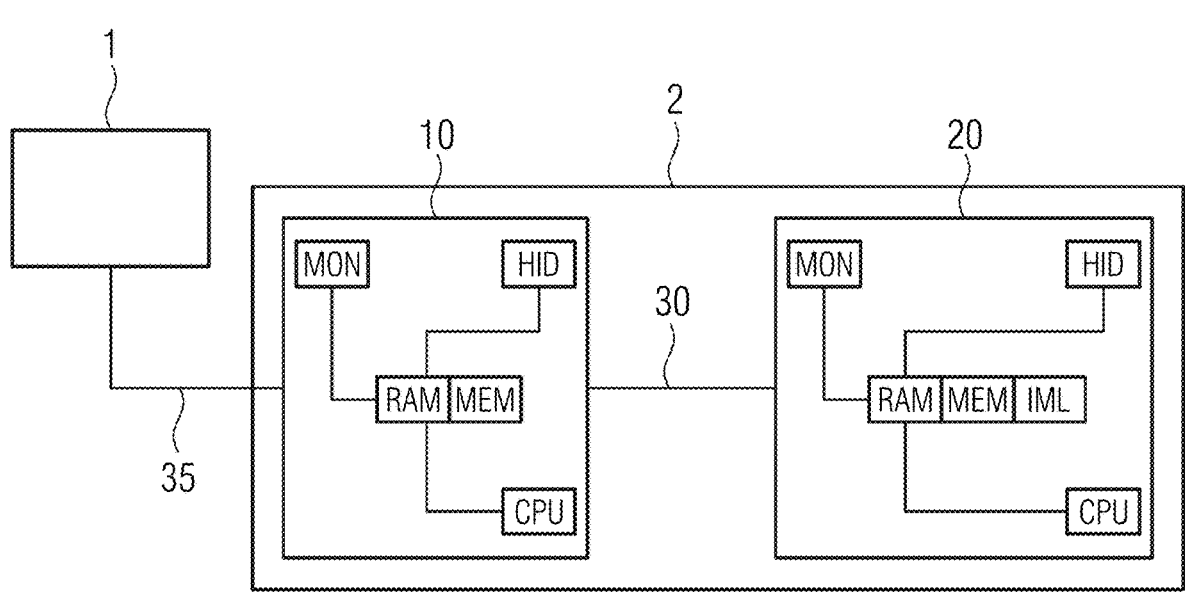
FIG. 3 depicts a schematic view of the distributed system for providing a Domain Model for an industrial system according to an embodiment.

In FIG. 3 an embodiment of the distributed system 2 for providing a Domain Model DM for an industrial system 1 is schematically depicted. The distributed system 2 includes at least one (here exemplarily one) local computer 10 of at least one customer, the external computer 20 of the service provider and a (first) data connection 30.

The at least one local computer 10 and the external computer 20 may each be a personal computer (PC), a laptop, a tablet, a server, a distributed system (e.g., cloud system) and the like. The at least one local computer 10 and the external computer 20 each include a central processing unit CPU, a memory including a random-access memory RAM and a non-volatile memory MEM (e.g., hard disk), a human interface device HID, (e.g., keyboard, mouse, touch-screen etc.) and an output device MON (e.g., monitor, printer, speaker, etc.). The external computer 20 additionally includes the Industrial Model Library IML. The CPU, RAM, HID and MON are communicatively connected via a data bus. The RAM and MEM and the IML are communicatively connected via another data bus.

The local computer 10 and the external computer 20 are communicatively coupled by the data connection 30. The local computer 10 executes the Local Application LA (see FIG. 2) and receives the Industrial Data ID from the industrial system 1 via a second data connection 35. The external computer 20 executes the External Application EA (see FIG. 2) and receives the Hidden Features HF extracted by the Local Application LA on the local computer 10 via the data connection 30. The External Application EA on the external computer 20 determines the Domain Model DM for the industrial system 1 and provides the Domain Model DM to the local computer 10 of the customer via the data connection 30.

Figure 4:
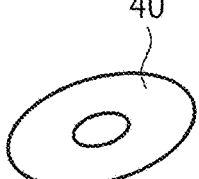
FIG. 4 depicts a schematic view of the computer-readable medium according to an embodiment.

In FIG. 4 an embodiment of the computer-readable medium 40 is schematically depicted. A computer-readable storage disc 40 like a Compact Disc (CD), Digital Video Disc (DVD), High-Definition DVD (HD DVD) or Blu-ray Disc (BD) has stored there on the computer program as schematically shown in FIG. 1. However, the computer-readable medium may also be a data storage like a magnetic storage/memory (e.g. magnetic-core memory, magnetic tape, magnetic card, magnet strip, magnet bubble storage, drum storage, hard disc drive, floppy disc or removable storage), an optical storage/memory (e.g. holographic memory, optical tape, Tesa tape, Laserdisc, Phasewriter (Phasewriter Dual, PD) or Ultra Density Optical (UDO)), a magneto-optical storage/memory (e.g. MiniDisc or Mag-neto-Optical Disk (MO-Disk)), a volatile semiconductor/solid state memory (e.g. Random Access Memory (RAM), Dynamic RAM (DRAM) or Static RAM (SRAM)) or a non-volatile semiconductor/solid state memory (e.g. Read Only Memory (ROM), Programmable ROM (PROM), Eras-able PROM (EPROM), Electrically EPROM (EEPROM), Flash-EEPROM (e.g. USB-Stick), Ferroelectric RAM (FRAM), Magnetoresistive RAM (MRAM) or Phase-change RAM).

Figure 5:
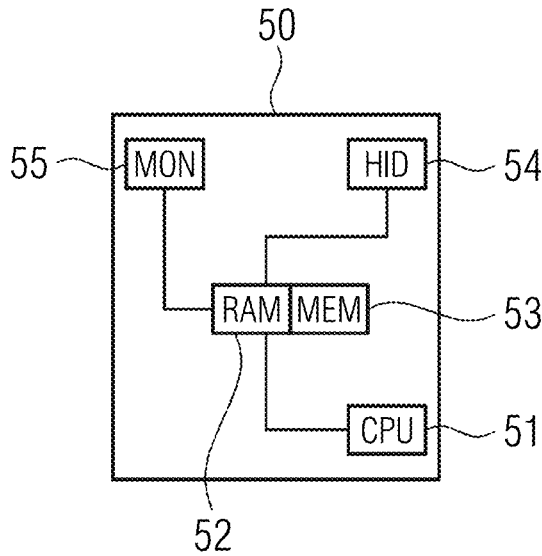
FIG. 5 depicts a schematic view of the data processing system according to an embodiment.

In FIG. 5 an embodiment of the data processing system 50 is schematically depicted. The data processing system 50 may be a personal computer (PC), a laptop, a tablet, a server, a distributed system (e.g., cloud system) and the like. The data processing system 50 includes a central processing unit (CPU) 51, a memory having a random-access memory (RAM) 52 and a non-volatile memory (MEM, e.g., hard disk) 53, a human interface device (HID, e.g., keyboard, mouse, touchscreen etc.) 54 and an output device (MON, e.g., monitor, printer, speaker, etc.) 55. The CPU 51, RAM 52, HID 54 and MON 55 are communicatively connected via a data bus. The RAM 52 and MEM 53 are communi-catively connected via another data bus. The computer program schematically depicted in FIG. 1 may be loaded into the RAM 52 from the MEM 53 or another computer-readable medium 40. According to the computer program the CPU executes the steps of the computer-implemented method schematically depicted in FIGS. 1. The execution may be initiated and controlled by a user via the HID 54. The status and/or result of the executed computer program may be indicated to the user by the MON 55. The result of the executed computer program may be permanently stored on the non-volatile MEM 53 or another computer-readable medium.

For example, the CPU 51 and RAM 52 for executing the computer program may include several CPUs 51 and several RAMs 52 for example in a computation cluster or a cloud system. The HID 54 and MON 55 for controlling execution of the computer program may be included by a different data processing system like a terminal communicatively con-nected to the data processing system 50 (e.g., cloud system).

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applica-bility, or configuration in any way. Rather, the foregoing summary and detailed description will provide those skilled in the art with a convenient road map for implementing at least one exemplary embodiment, it being understood that various changes may be made in the function and arrange-ment of elements described in an exemplary embodiment without departing from the scope as set forth in the appended claims and their legal equivalents. This application is intended to cover any adaptations or variations of the specific embodiments discussed herein.

In the foregoing detailed description, various features are grouped together in one or more examples for the purpose of streamlining the disclosure. It is understood that the above description is intended to be illustrative, and not restrictive.

It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments are pre-sented for purposes of illustration and description. They are not intended to be exhaustive or to limit embodiments to the precise forms disclosed; many modifications and variations are possible in view of the above teachings. The embodi-ments were chosen and described in order to best explain the principles of the invention and its practical applications, to thereby enable others skilled in the art to best utilize the invention and various embodiments with various modifica-tions as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects. In the context of the present description and claims the conjunction "or" is to be under-stood as including ("and/or") and not exclusive ("either . . . or").

It is to be understood that the elements and features recited in the appended claims may be combined in different ways to produce new claims that likewise fall within the scope of the present invention. Thus, whereas the dependent claims appended below depend from only a single indepen-dent or dependent claim, it is to be understood that these dependent claims may, alternatively, be made to depend in the alternative from any preceding or following claim, whether independent or dependent, and that such new com-binations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of providing a Domain Model for an industrial system, the method com-prising:

providing a joint application comprising a local applica-tion and an external application, wherein at least one input layer of the joint application is configured to receive confidential Industrial Data of the industrial system, wherein at least one output layer of the joint application is configured to output the Domain Model for the industrial system;

downloading the local application to a local computer of a customer;

locally extracting Hidden Features from confidential Industrial Data of the industrial system by the Local Application executed on the local computer, wherein the local application includes the at least one input layer of the joint application;

uploading the Hidden Features to an external computer of a service provider, wherein no confidential industrial data is provided to the external computer;

externally determining, without using the confidential industrial data, the Domain Model for the industrial system from an Industrial Model Library on the external computer based on the uploaded Hidden Features by the External application comprising at least one Machine Learning Model executed on the external computer, wherein the external application includes the at least one output layer of the joint application;

providing the Domain Model for the industrial system to the customer;

wherein the at least one Machine Learning Model is trained on ranking one or more Domain Models for respective industrial systems based on Hidden Features of the respective industrial systems, and wherein the one or more Domain Models represent one or more relevant technical aspects of the respective industrial systems.

2. The method of claim 1, wherein the External application comprises a multitude of Machine Learning Models stored in a Machine Learning Model Library on the external computer or accessible with the external computer, and wherein externally determining the Domain Model includes:

selecting Machine Learning Models from the Machine Learning Model Library based on the uploaded Hidden Features by finding sets of features associated with the Machine Learning Models most similar to the uploaded Hidden Features;

ranking the Machine Learning Models according to an applicability based on feature set similarities; and ranking the one or more Domain Models for the industrial system based on the uploaded Hidden Features by the selected and ranked Machine Learning Models.

3. The method of claim 2, wherein the External application comprises general purpose Machine Learning Models and for selecting appropriate Machine Learning Models, the appropriate Machine Learning Models are further selected by configuring the general purpose Machine Learning Models based on the uploaded Hidden Features.

4. The method of claim 1, further comprising:

uploading the provided Domain Model together with information about the industrial system to the external computer; and storing the uploaded Domain Model and the information about the industrial system in the Industrial Model Library on the external computer.

5. The method of claim 1, further comprising:

configuring the Domain Model based on feedback of domain experts on the Domain Model.

6. A non-transitory computer implemented storage medium that stores machine-readable instructions executable by at least one processor to generate an augmented reality, the machine-readable instructions comprising:

providing a joint application comprising a local application and an external application, wherein at least one input layer of the joint application is configured to receive confidential Industrial Data of an industrial system, wherein at least one output layer of the joint application is configured to output a Domain Model for the industrial system;

locally extracting Hidden Features from Industrial Data of an industrial system by the Local Application executed on a local computer of a customer, wherein the local application includes the at least one input layer of the joint application;

uploading the Hidden Features to an external computer of a service provider;

externally determining, without using the confidential industrial data, a Domain Model for the industrial system from an Industrial Model Library on the external computer based on the uploaded Hidden Features by an External application comprising at least one Machine Learning Model executed on the external computer, wherein the external application includes the at least one output layer of the joint application;

providing the Domain Model for the industrial system to the customer;

wherein the at least one Machine Learning Model is trained on ranking one or more Domain Models for respective industrial systems based on Hidden Features of the respective industrial systems, and wherein the one or more Domain Models represent one or more relevant technical aspects of the respective industrial systems.

7. The non-transitory computer implemented storage medium according to claim 6, wherein the machine-readable instructions further comprise:

configuring the Domain Model based on feedback of domain experts on the Domain Model.

8. The non-transitory computer implemented storage medium according to claim 7, wherein the machine-readable instructions further comprise:

uploading the provided Domain Model together with information about the industrial system to the external computer; and storing the uploaded Domain Model and the information about the industrial system in the Industrial Model Library on the external computer.

9. A Distributed system for providing a Domain Model for an industrial system, the Distributed system comprising:

at least one local computer of at least one customer, the at least one local computer configured to execute a Local Application of a joint application, wherein the joint application comprises the local application and at least one external application, wherein at least one input layer of the joint application is configured to receive confidential Industrial Data of the industrial system, wherein at least one output layer of the joint application is configured to output the Domain Model for the industrial system, wherein the local application includes the at least one input layer of the joint application;

an external computer of a service provider configured to execute the at least one External application comprising at least one Machine Learning Model, the external application including the at least one output layer of the joint application; and at least one data connection between the at least one local computer and the external computer configured to upload Hidden Features from the at least one local computer to the external computer and to provide a Domain Model from the external computer to the at least one customer;

wherein at least one Local Application is configured to locally extract the Hidden Features from Industrial Data of the industrial system, wherein the at least one External Application is configured to externally determine the Domain Model for the industrial system from an Industrial Model Library on the external computer based on the Hidden Features uploaded from the at least one local computer via the at least one data connection, wherein the at least one Machine Learning Model is trained on predicting one or more Domain Models for respective industrial systems based on Hidden Features of the respective industrial systems, and wherein the one or more Domain Models represent one or more relevant technical aspects of the respective industrial systems.

10. The Distributed system of claim 9, wherein the External Algorithm comprises a multitude of Machine Learning Models stored in a Machine Learning Model Library on the external computer or accessible with the external computer, and wherein the at least one External Application is configured to determine the Domain Model by:

selecting Machine Learning Models from the Machine Learning Model Library based on the uploaded Hidden Features by finding sets of features associated with Machine Learning Models most similar to the uploaded Hidden Features;

ranking the Machine Learning Models according to an applicability based on feature set similarities; and ranking the one or more Domain Models for the industrial system based on the uploaded Hidden Features by the selected and ranked Machine Learning Models.

11. The Distributed system of claim 9, wherein the at least one local computer and the at least one data connection are further configured to forward and upload the provided Domain Model together with information about the industrial system to the external computer, and wherein the external computer is further configured to store the uploaded Domain Model and the information about the industrial system in the Industrial Model Library on the external computer.

\* \* \* \* \*